(12) United States Patent
Battu

(10) Patent No.: US 6,730,888 B1
(45) Date of Patent: May 4, 2004

(54) BREAD TOASTING CONTROL IN A TOASTER BY RESPONSE CURVE OF PHOTOSENSITIVE ELEMENT(S)

(75) Inventor: Claude Battu, Le Syndicat (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/030,046

(22) PCT Filed: Jun. 30, 2000

(86) PCT No.: PCT/FR00/01877

§ 371 (c)(1),
(2), (4) Date: Jun. 10, 2002

(87) PCT Pub. No.: WO01/03558

PCT Pub. Date: Jan. 18, 2001

(30) Foreign Application Priority Data

Jul. 8, 1999 (FR) .............................. 99 09045

(51) Int. Cl.$^7$ ............................... H05B 1/02
(52) U.S. Cl. .................. 219/502; 219/521; 99/385; 99/331
(58) Field of Search ............... 219/502, 518, 219/497, 521; 99/385–402, 331–333

(56) References Cited

U.S. PATENT DOCUMENTS

| | | | | |
|---|---|---|---|---|
| 2,110,748 A | * | 3/1938 | Tweedale | 99/385 |
| 2,631,523 A | * | 3/1953 | Olving | 99/385 |
| 4,245,148 A | | 1/1981 | Gisske et al. | |
| 4,363,957 A | * | 12/1982 | Tachikawa et al. | 219/497 |
| 4,426,572 A | * | 1/1984 | Tachikawa et al. | 219/502 |
| 4,433,232 A | | 2/1984 | Tachikawa et al. | |
| 5,126,536 A | * | 6/1992 | Devlin | 219/497 |
| 5,170,024 A | * | 12/1992 | Hanatani et al. | 219/494 |
| 5,938,962 A | * | 8/1999 | Adamski et al. | 219/502 |
| 6,006,656 A | * | 12/1999 | Lulofs et al. | 99/327 |
| 6,049,070 A | * | 4/2000 | Arnedo et al. | 219/502 |
| 6,104,494 A | * | 8/2000 | Torbet et al. | 356/425 |
| 6,106,877 A | * | 8/2000 | Allington et al. | 426/233 |

FOREIGN PATENT DOCUMENTS

| | | | |
|---|---|---|---|
| GB | 2199733 | * | 7/1988 |
| JP | 63-254324 | * | 10/1988 |
| JP | 63-254325 | * | 10/1988 |
| JP | 2-21131 | * | 1/1990 |
| JP | 3-144325 | * | 6/1991 |
| JP | 5-209825 | * | 8/1993 |
| JP | 6-281152 | * | 10/1994 |
| WO | 89 01279 | | 2/1989 |

* cited by examiner

*Primary Examiner*—John A. Jeffery
(74) *Attorney, Agent, or Firm*—Browdy and Neimark, P.L.L.C.

(57) ABSTRACT

Method and device for controlling the grilling, or toasting, of a food product placed in a toaster or toaster oven that has heating elements, a heating chamber, a grilling selector for adjusting the level of browning of the food product, an element for stopping the supply of electricity to the heating elements when the level of toasting is achieved and a light-receiving system composed of at least one photo-resistive element of the LDR type disposed for detecting light reflected by the food product being grilled or toasted. The grilling or toasting is controlled by measuring the evolution in time of a signal G representative of the light reflectivity of the food product, and converting at least one characteristic of that evolution into at least one of the grilling or toasting states of the food product.

23 Claims, 6 Drawing Sheets

BREAD TOASTING CONTROL IN A TOASTER BY RESPONSE CURVE OF PHOTOSENSITIVE ELEMENT(S)

REFERENCE TO RELATED APPLICATIONS

The present application is the national stage under 35 U.S.C. 371 of international application PCT/FR00/01877, filed Jun. 30, 2000 which designated the United States, and which international application was not published under PCT Article 21(2) in the English language.

BACKGROUND OF THE INVENTION

The present invention concerns a method for controlling the grilling, or toasting, of a food product in a toaster, and more particularly the use of one or several photosensitive sensors for carrying out this control.

It is known, in bread toasting appliances, to provide a time delay that is adjustable by the user, in order to fix the cooking time for the bread. This simple method does not always give satisfactory results, notably because of lack of initial knowledge of the time necessary to obtain a given toasting or color for the bread.

Other systems propose a determination of the color of the bread during the course of toasting with the aid of a specific sensor measuring the reflectivity, produced by the bread, of a light signal.

The document WO89/01279 describes such a sensor using an electronic control circuit for an electric device for cooking food products having a maximalizing circuit intended to determine, by a first signal $V_1$, the maximum level of light reflected by the food product, then to measure the light reflected by the food product leading to a second signal $V_2$, the maximalizing circuit having an amplifier supplying a signal $V_3$ proportional to the difference between the $V_2$ and $V_1$, a comparator permitting a comparison of $V_3$ with a preset signal $V_B$, which is proportional to a desired cooking level. The comparator emits a signal at the end of cooking to deactivate the cooking when the preset signal and the third signal are substantially equal. The signal $V_2$ is constructed around a resistance whose value depends on the quantity of incident light. Such resistances are commonly called LDR.

Such a devices is rather complex and costly with regard to elements since it comprises several electrical signals to compare, amplifiers, comparators and necessitates the establishment of a comparison voltage value $V_B$.

Moreover, from the standpoint of security, a conventional time delay requires a safety device detecting the start of burning of the bread and any presence of flames in the toaster.

In addition, when the power of the heating elements is substantial, it is necessary that the device have a significant response, a response that conventional time delays cannot provide.

BRIEF SUMMARY OF THE INVENTION

The present invention seeks to overcome these drawbacks by providing a simplified process for controlling the degree of browning of a food product disposed in a grilling appliance, by the evolution of the light coming from the food product being grilled.

The present invention is achieved with the aid of a method for controlling the grilling, or toasting, of a food product placed in a grilling appliance of the toaster or oven type, said appliance comprising, in particular, heating elements, a heating chamber, a grilling selector for adjusting the level of browning of the food product, means for stopping the supply of electricity to the heating elements when the level of toasting is achieved, said device having a light-receiving system composed of at least one photo-resistive element of the LDR type, the light reflected by the food product being grilled or toasted being brought up to the surface of said element(s), characterized in that it consists in measuring the evolution in time of a signal G representative of the light reflectivity of the food product, and converting at least one characteristic of that evolution into at least one of the grilling or toasting states of the food product.

According to the invention, one of the grilling or toasting states is manifested by a slope of the signal G stabilizing at a determined value, or by a zero slope, or by an inversion of the slope, or by a point of inflexion in the slope of the curve, or by a difference in the curve or in the slope of the curve by a certain amount with respect to said value for shorter times.

The grilling states being correlated with a particular evolution of the signal, this curve becomes universal and a simple calibration in the factory permits establishment of the desired relationships.

Advantageously, this method consists equally in determining the ambient temperature within the appliance, and in blocking a new cooking cycle when the value of the ambient temperature exceeds a predetermined value.

This particularity is notably important for high heating power levels being able to lead to, when numerous cycles are effectuated, a temperature elevation that could be dangerous for the user.

Advantageously, the method also consists in determining the signal representative of the light reflectivity at two instants that are close together and following the application of electricity to the heating elements in order to determine, according to the evolution of this signal, the presence or not of a food product in the heating chamber.

It can be, in effect, desirable, for example in the case of a toaster, to block the operation of the appliance when no slice is placed to be toasted in the heating chamber. A rapid decrease in the light reflectivity signal permits the absence of bread to be identified.

Advantageously, the method for controlling grilling consists equally in halting the supply of electricity to the heating elements when, following the start of delivery of electricity to said heating elements, the light reflectivity signal is below a predetermined value.

This system permits avoiding, on the one hand, regrilling a food product that has already been grilled, and, on the other hand, blocking the toasting of special breads, of which the presence of grains or other ingredient gives it a dark color. It is known that this bread is difficult to toast, the automatic toasting procedure such as described previously is thus not desirable.

Advantageously, the method for controlling grilling is associated with a method for controlling grilling with a time delay where different grilling states, determined by the grilling selector, correspond to cooking times calibrated in the factory.

Thus, the device for controlling by a photo-resistive element only determines certain grilling states or is used, for safety purposes, as a fuse.

Another object of the present invention, is to provide a low cost system permitting toasting of any type of bread, stale or frozen, by controlling the toasting color assumed by the bread, and this regardless of the parameters of use or characterization of the toaster: duration of stoppage between cycles, partial or complete loading of the bread carriage, variation of the power supply voltage, power and type of heating bars.

The present invention also has for its object a device for controlling the grilling of a food product placed in a grilling appliance of the toaster or oven type, said appliance comprising notably heating elements, a grilling selector permitting adjustment of the level of browning of the food product, means for stopping the supply of electricity to the heating elements when the grilling level is attained, a microcontroller, said device having a light receiving system composed of at least one photo-resistive element of LDR type, the light reflected by the food product being grilled being brought up to the surface of said element(s), inserted in an electronic circuit permitting measurement of a voltage, characterized in that this voltage is transformed into a signal G which can be the value of the resistance of the photo-resistive element or of one of the photo-resistive elements, or a magnitude proportional to said resistance, said signal being stored at successive instants in the microcontroller, in order to determine the evolution of said signal and to stop the heating elements according to at least one predetermined evolution criterion.

This device permits freedom from numerous variables determining the grilling of the food products and notably of bread and which can vary in an undesirable manner with the level of voltage of the supply mains, or according to the heating powers used or the aging of the heating elements, for example.

According to the invention, the predetermined evolution criteria represent different grilling states of the food product.

According to a first embodiment of the invention, the signal is constituted by the value of the resistance of the photo-resistive element or of one of the photo-resistive elements, obtained by measuring the voltage at the terminals of this element in a dividing bridge arrangement, said voltage being sent to an analog input-output port of the microcontroller.

This arrangement, very simple to achieve, permits, by a simple voltage measurement, to obtain the characteristic parameter of the light sent to the sensor by the food product.

According to a second embodiment, the signal is constituted by the time for charging a capacitor through the resistance presented by the photo-resistive element or one of the photo-resistive elements, that is an analog/digital conversion system, each element being associated with a capacitor and connected to numeric inlet-outlet ports of the microcontroller.

This arrangement permits the use of a microcontroller having only numeric inputs, which reduces the cost of the component.

Advantageously, according to the first or second embodiment, the grilling control device has at least two photo-resistive elements, the signal G being successively and cyclically determined for each photo-resistive element.

By providing several photo-resistive sensors, the evolution of which is followed in parallel, and step-by-step, the determination of the overall grilling state of the food product is improved. In effect, the evolution of several sensors increases the reliability of the determination of the degree of grilling achieved.

Moreover, when the device is used in a toaster, by disposing sensors at each side of the heating chamber, it is possible to follow the evolution of each surface of the bread, and to modify the supply of electricity to the heating elements for each surface, whether the bread surfaces are initially identical or not, in order to obtain a uniform grilling on each of the surfaces of the bread, or in order to stop the heating elements in order to avoid charring of one of the surfaces of the bread.

According to this construction, stopping of the heating elements is triggered as soon as the evolution of the signal of one of the photo-resistive elements attains the predetermined evolution criteria. This solution permits avoiding all risk of charring of one part of the food product when several pieces are introduced.

According to a construction variant of these different embodiments, the laws of behavior link the evolutions of the signal of the different photo-resistive elements in order to determine the operating state of the appliance.

By using several photo-resistive elements, according to the evolution of the signal representative of the light received, different conclusions regarding the presence of the food product and regarding the nature of their surface (for example the soft part and the crust of the baguette) can be determined. According to certain predefined schemes, different actions can be envisioned.

Advantageously, a light guide connects the heating chamber of the appliance to the photo-resistive sensor situated on an electronic card spaced from the heating chamber. This device permits the electronic card to be held at a distance from the heating chamber where elevated temperatures can damage said card.

Advantageously, a filter, such as an IR filter is disposed in front of each photo-resistive element in order to contrast the response curve of the LDR sensor.

Another object of the present invention is to provide a grilling control device on a large spatial surface, in order to be free of the hazards of distribution of the food products to be grilled on the receiving device provided for this purpose.

This object is achieved with aid of a device for controlling the grilling of a food product placed in a grilling appliance of the toaster or oven type, said appliance comprising notably heating elements, a heating chamber comprising a surface for introduction of the food product, a grilling selector permitting adjustment of the level of browning of the food product, means permitting stopping of the electric supply to the heating elements when the browning level is attained, said device having a light receiving system composed of at least two photo-resistive sensors of the LDR type, characterized in that the sensors are arranged on a line parallel to the surface of introduction of the food product, facing said food product.

By such an arrangement, one increases the observation coverage of the food product that is to be grilled, while avoiding that the food products are disposed in the heating chamber without being detected by the sensor when there is only one.

According to a preferred form of construction of the invention, the grilling control device has three sensors equidistant from one another, the central sensor being substantially disposed facing the heating chamber, in its central plane.

The use of three sensors appears to be a good compromise between the coverage proposed by the assembly of these sensors, relative to the viewing angle of each sensor, and this, whether the appliance is a toaster or an oven. The equidistance and the centering of the sensors optimizes the coverage of these zones.

Advantageously, the sensors are inclined with respect to the plane of introduction of the food product by an angle between 30 and 90.

This inclination permits the coverage of the observed zones to be increased, while offering the possibilities of protection from the radiation emitted by the heating elements.

The present invention aims equally at the construction of a cooking appliance of the toaster or oven type, characterized in that it includes a process for controlling grilling of food products such as previously described.

Another object of the invention relates to a cooking appliance of the toaster or oven type, characterized in that it has a device for controlling the grilling of food products such as previously described.

BRIEF DESCRIPTION OF THE DRAWINGS

The present invention will be better understood with the aid of the description that will follow, with reference to the attached figures, given by way of non-limiting example, among which.

DETAILED DESCRIPTION OF THE INVENTION

Although the present invention is preferably intended for high power toasters, it can be applied to any toaster, regardless of its power, as well as to appliances of the household electric oven type.

The present invention being relative to the process of controlling the coloration of a slice of bread being toasted in a toaster, there will not be described in detail the mechanisms of operation of said toaster which will be presented in a simplified manner.

According to the present invention, the toaster has a device for controlling the toasting state of the bread. A photo-resistive element of the LDR (Light Depending Resistor) type which will be called hereafter a sensor, is oriented toward the bread through the grilling enclosure or heating chamber. Regulation of the heating system is based on the response curve of the sensor. Such a sensor in effect has a resistance that diminishes when the light intensity increases, a reversible phenomenon.

Figure 1:
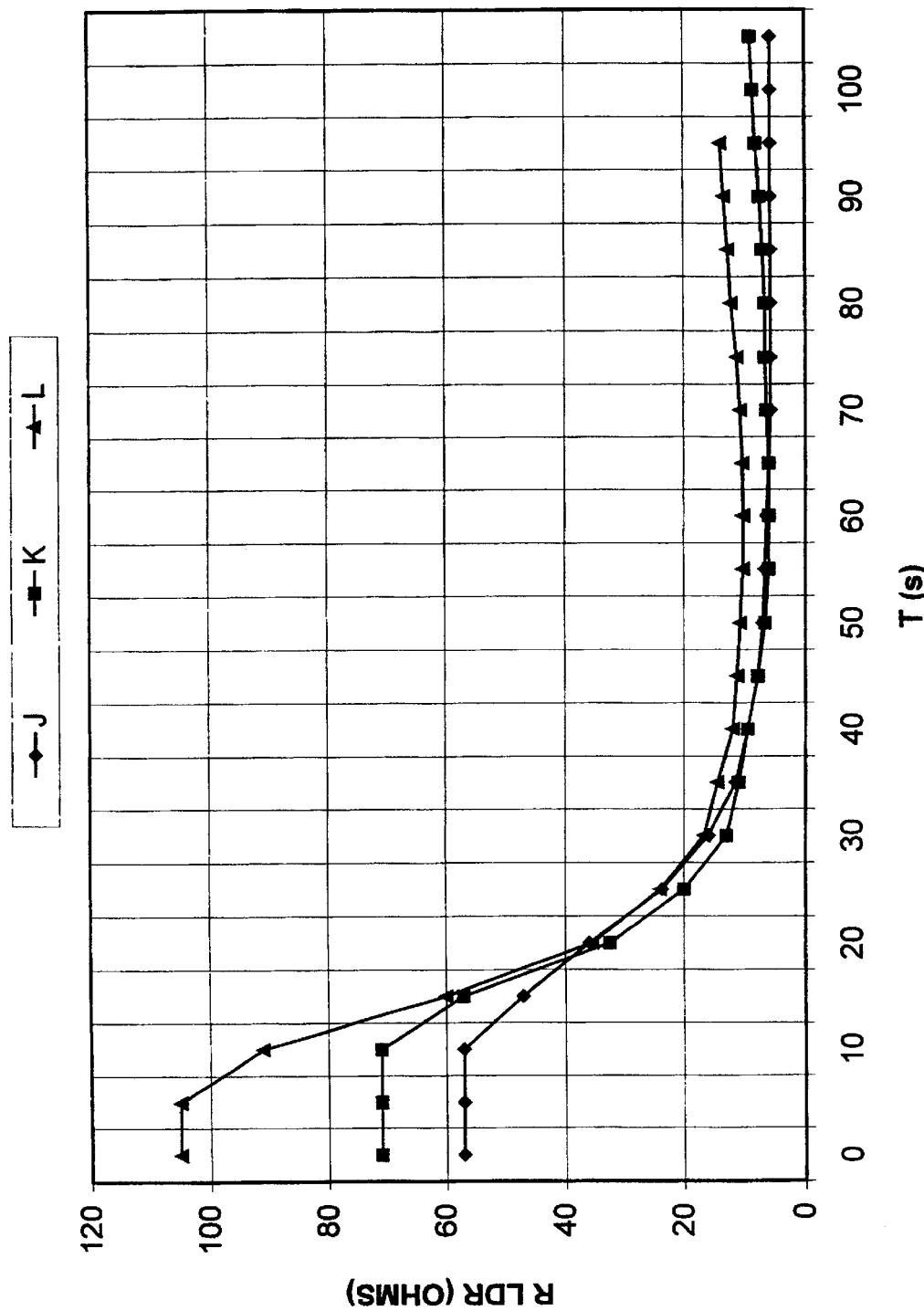
FIG. 1 describes characteristic response curves of a photo-resistive element of the LDR type disposed in a toaster.

FIG. 1 shows the general evolution of the resistance $R_{LDR}$ of such a sensor as a function of time, when this sensor is placed in the cooking enclosure of a toaster. The time t=0 corresponds to the switching on of the supply of electricity to the heating means.

Thus, a first curve J presents the evolution of this signal when a white ceramic has been introduced into the slot of the toaster. This ceramic not evolving insofar as concerns its color, the curve is then a reflection of the heating with the heating means. In effect, these latters when they are heated, have an inertia that is translated into an increasing luminance, leading to a reduction in the resistance of the sensor.

The curves K and L present a time evolution of the resistance $R_{LDR}$ when a slice of bread is placed to be toasted, the bread being of the sandwich bread type for curve K, and of the baguette type for the curve L. The evolutions of curves K and L are different from the evolution of curve J since the bread, while browning, acts on the value of the resistance of the sensor in reflecting less and less the light from the heating means, as the toasting progresses. This effect is particularly visible in FIG. 2.

Figure 2:
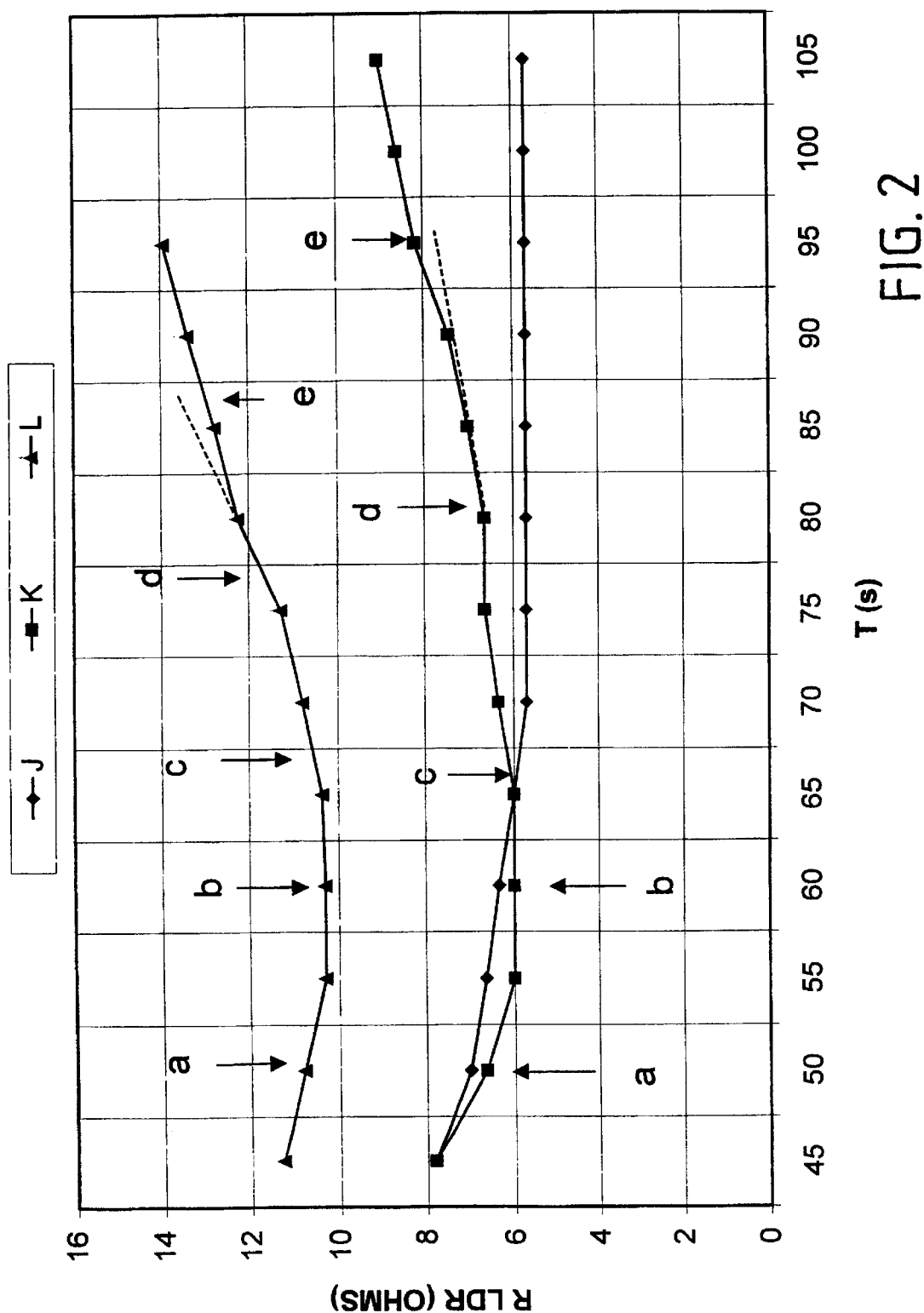
FIG. 2 represents the detailed evolution of a part of the response of a photo-resistant element of the LDR type disposed in a toaster.

FIG. 2 presents a detail of the time evolution of the sensor LDR in the three cases cited previously. The zone represented corresponds to the zone used for the determination of the toasting state of the bread.

For times greater than around 50 s, the rate of change of the curves K and L is clearly different from the rate of change of the curve J, as previously explained.

This general rate of change of the curves K and L can be exploited for the determination of the different characteristic types of browning and recalled below.

In effect, there are generally defined 5 grilling qualities:
"A": the bread is slightly hard, there is not yet a change of color,
"B": several points of coloration appear on the bread,
"C": the bread begins to become golden,
"D": the bread is toasted to a dark brown,
"E": the bread begins to blacken.

This influence of the coloration of the bread on curve G is translated notably by the following facts, for a power of 1100 Watts:
zone "a": the slope is stabilized at a determined value, the derivative of the value $R_{LDR}$ is practically constant,
zone "b" corresponding to the first zero slope,
zone "c" corresponding to the first inversion of the slope of the curve,
zone "d", where the slope has a difference relative to the slope of the curve in the zone defined in "c",
zone "e" corresponding to a difference of the curve by a certain value with respect to the zone "c".

It is worth noting that each of these particularities of the curve corresponds to a toasting state. In the scenario presented for a heating power of 1100W, the points a, b, c, d, e correspond to the toasting states A, B, C, D, E, defined previously. For this heating power, the state "C" corresponding to the point "c" is characterized by a difference of 2 to 10% of the slope defined at point "b", the value of this difference being determined, notably according to the heating means, the power, as well as by other parameters. Similarly, the state "E" corresponding to the point "e" is characterized by a drop of 10% in the curve with respect to its maximum, defined at point "d".

This situation is only one example. Certain parameters, such as the power of the heating elements, can affect the curve, but this latter retains however the same rate of change, it is simply more or less shifted in time.

Thus, for a certain type of heating elements, the characteristic "c" of the curve corresponds to the state "B" of grilling. Other combinations are possible. The fact remains that these particularities are known during assembly of the toaster in the factory, and that it is consequently easy to "set" the characteristic points of the curve to the real grilling states of the bread.

The particularities of the curve of time evolution of $R_{LDR}$ can thus be utilized for the determination of a grilling state of the bread.

In concrete terms, the value $R_{LDR}$ is given, in a first form of use, by measurement of the voltage $U_{LDR}$ at its terminals.

Figure 3:
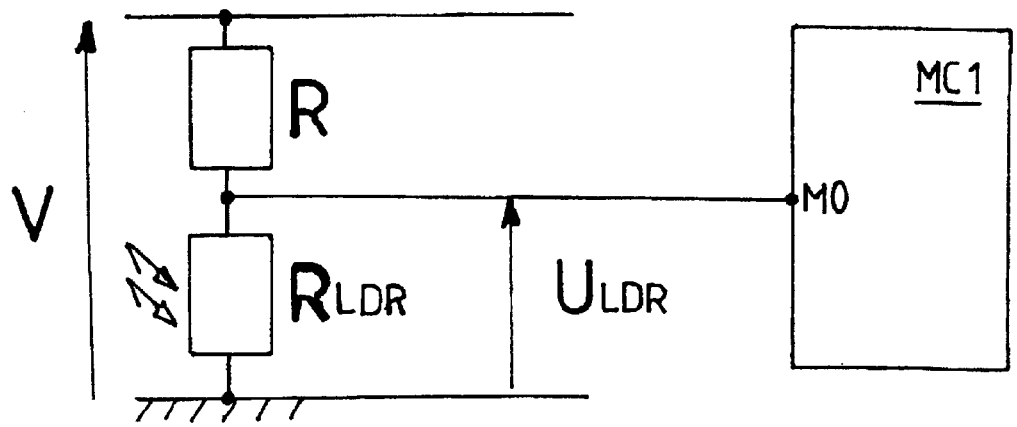
FIG. 3, shows a first variant of implantation of a photo-resistive element of the LDR in a measuring circuit.

FIG. 3 shows such an arrangement where the LDR sensor is placed in an electric circuit of the divider bridge type. This sensor, presenting a resistance $R_{LDR}$, is connected in series with a resistance R, these two resistances being supplied with a voltage V. The voltage at the terminals of the sensor is designated $U_{LDR}$.

The resistance $L_{LDR}$ at the terminals of the sensor can be written:

$$R_{LDR}=R[V/(V-U_{LDR})-1]$$

Thus, the single measurement of the voltage $U_{LDR}$ at the terminals of $R_{LDR}$ permits the value of the resistance between the terminals of the sensor to be known.

Then, this arrangement of a divider bridge can be integrated into a purely analog circuit.

Advantageously, the use of the value of the LDR sensor is carried out with the aid of a microcontroller designated MC1 on FIG. 3 and having analog inputs. In this case, the voltage $U_{LDR}$ between the terminals of the LDR sensor is directly introduced to an input MO which is one of the inlet-outlet ports of microcontroller MC1.

Figure 4:
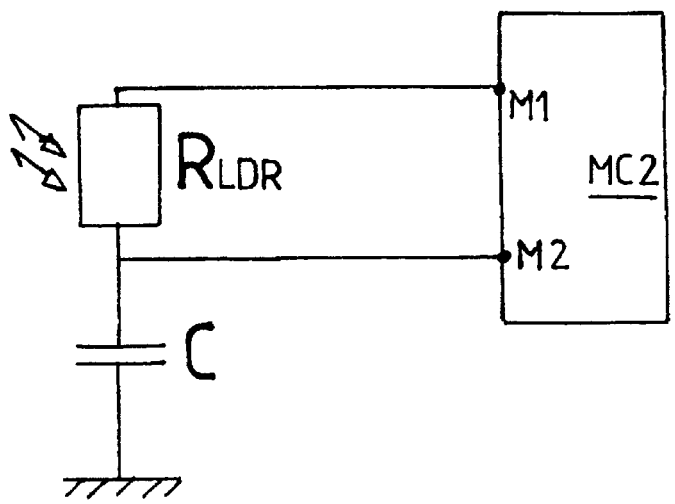
FIG. 4 shows a second variant of implantation of a photo-resistive element of the LDR type in a measuring circuit.

When the microcontroller does not have analog inputs, the arrangement of FIG. 4 is utilized, in order to place the indication furnished by the sensor in numerical form.

In this arrangement, the LDR sensor is mounted in series with a capacitor C the other end of which is connected to ground, the sensor being connected by its end to the pin M1 of the microcontroller MC2. The point of connection between the sensor and the capacitor is connected to the pin M2 of the microcontroller MC2. M1 and M2 are two input-output ports of the microcontroller MC2.

The measurement principle rests on the determination of the charging time of capacitor C through resistance $R_{LDR}$ of the sensor. The following sequences are thus generated by microcontroller MC2:

placing ports M1 at a high impedance then placing port M2 at the low state in order to discharge capacitor C,
placing port M1 at the high state in order to charge the capacitor C through the resistance $R_{LDR}$ until toggling of input M2. The charging time is designated τ.

This charging time is directly proportional to the value of $R_{LDR}$. The evolution of the values of τ is thus the same as the evolution of $R_{LDR}$ which is the essential phenomenon of the invention.

Other components being able to play the same role as a microcontroller can be utilized, such as notably ASICS.

There can equally be envisioned a solution specific to microcontrollers equipped with inputs with comparators and utilizing a measurement base of the R-C type coupled to the internal timer of the microcontroller.

According to this type of toaster and according essentially to the power utilized, the destination country, . . . an adjustment is thus necessary but is that much easier when the control is achieved with the aid of a microcontroller programmed at the fabrication site. This arrangement equally permits calibration of the LDR sensor in order to individualize each toaster, a guarantee of reliability and safety. This calibration phase also permits reducing the spread encountered with the sensors and fixing a lower limit value, in order to reject bread that is too black either because of a previous toasting, or by the very nature of the bread.

In the case of high powers used for bread cooking, there can be produced a self-heating of the toaster due to the fact that the housing of the toaster does not have time to cool sufficiently between successive cooking operations. Therefore, in proportion as the cycles succeed one another, the temperature of the toaster increases, which can prove dangerous for the user but also for the components of the toaster.

Figure 5:
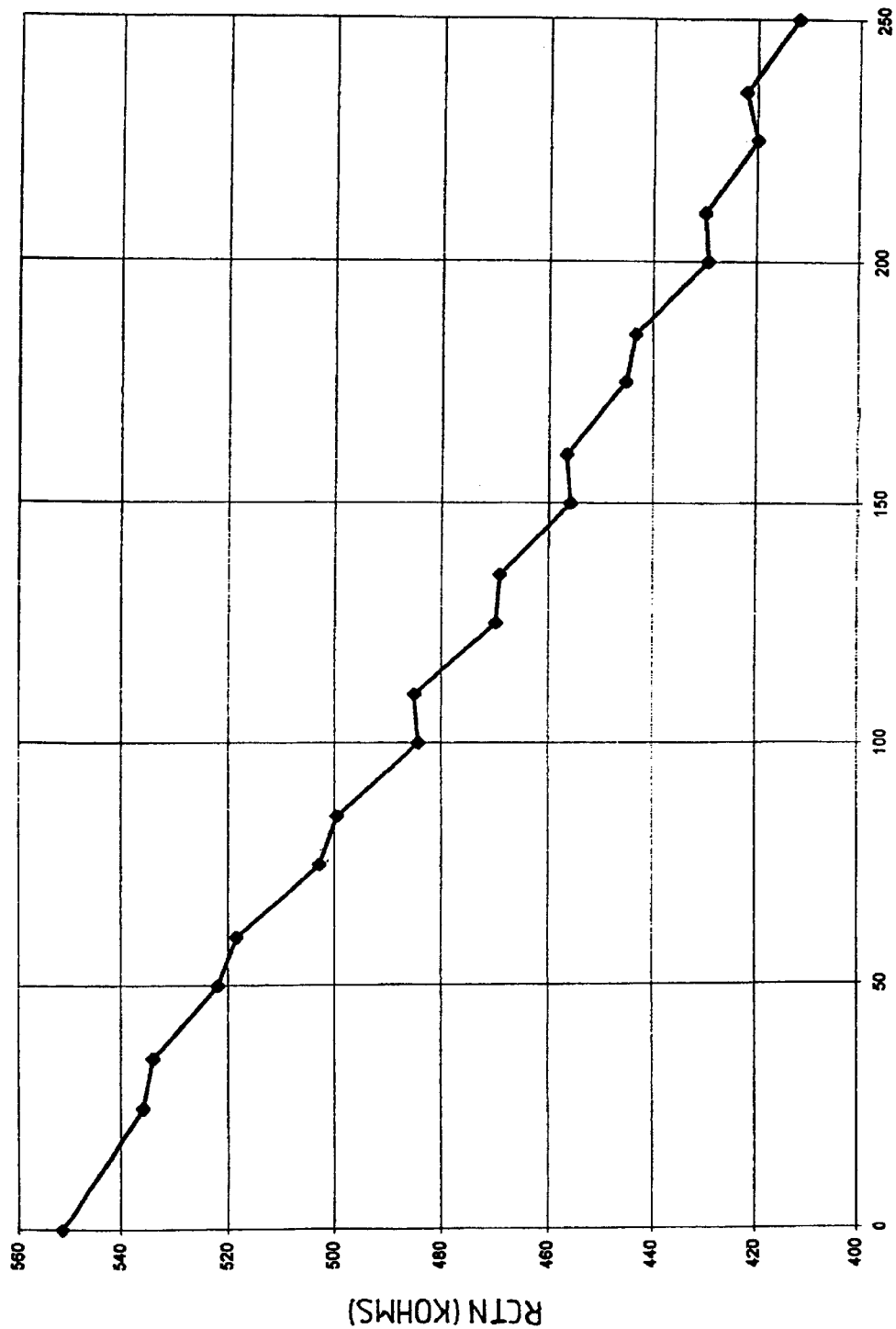
FIG. 5 represents the evolution of the resistance of a NTC element as a function of time when it is placed in a toaster in successive cycles.

There is then provided, advantageously, a NTC type sensor, whose resistance thus decreases when the temperature increases. Such a sensor can thus provide information on the general temperature of the toaster. FIG. 5 shows an example of the evolution of the resistance at the terminals of such a sensor for a toaster having a power of 200W during successive cycles, linked with a halt between cycles of around 5 seconds. After 9 cycles of 25 seconds each, the cooking time being reduced by substantial power values, the value of the resistance has decreased to 42 KΩ, representing a temperature of around 60° C.

It is thus possible to prevent new cooking cycles to the extent that a threshold temperature value is obtained, or, in electrical terms, to the extent that the value of the resistance presented by the NTC element is lower than a threshold value which can equally be calibrated at the factory.

One alternative consists in using oscillators of the R-C type present in the microcontroller and one of which can be rendered variable by the temperature. The microcontroller being at the ambient temperature of the toaster, it is then possible to determine the temperature by the variation in frequency of the oscillations.

In order to protect against significant fluctuations in the voltage of the electric supply mains, there can be provided a purely digital or purely electronic device to prevent abrupt variations of the voltage from being associated with a change in color (due to a change in the power of the heating elements). The principle is based on the fact that the variation of the curve due to a change of color is slow (of the order of 10% variation in 10 s) while the variation of the curve due to a voltage variation is abrupt (of the order of 2 s for a variation of 10%).

Consequently, a purely electronic solution can be envisioned, consisting in measuring the supply voltage and in adjusting the thresholds corresponding to the grilling levels depending on the voltage fluctuations, thus creating a feedback control loop.

It can equally be envisioned to effect a signal treatment consisting, starting from three points of the curve, of deducing therefrom a range of values for the following point, taking into account the slow variation of the signal. If the measured value is outside of this range, this signifies that this point is due to an artifact linked to the abrupt voltage variation, and the measurement is then not validated.

Concerning potential burning of the bread, this is generally produced after the point "D" and the point "E" and is characterized by the presence of flames, thus additional light on the LDR sensor. Thus, the evolution of the value of the resistance $R_{LDR}$, which has a tendency to present a positive slope after the point "D", will then increase because of the light from the flame. There can thus be provided a safety arrangement that will turn off the electric supply means if the slope of the curve becomes negative when the point "D" has been crossed. This safety arrangement permits, continuously, to monitor the risk of appearance of a flame in the toaster, either due to residual crumbs catching fire, or by an excessive toasting of the bread, and this regardless of the selected toasting level displayed.

Another security can advantageously be envisioned and concerns an activation of the heating elements in the absence of bread. The solution envisioned is a measurement at two time intervals that are different but rather close together, for example at t=0.5 second and at t=2.5 seconds, an increase greater than a certain threshold, to be calibrated, signifying the absence of bread.

Moreover, another level of security can be introduced in order to avoid an "over-toasting", which occurs when one desires to prolong the grilling of a slice which has just been grilled. It can then be provided to prevent, during a given time interval, a slice whose cooking has reached the level "D", since the curve having exceeded its maximum point, it is then difficult to provide correct measures and above all to halt the supply of electricity to the heating elements based on a criterion other than burning of the bread. This protection is to be compared with the impossibility of grilling "black" bread.

Another solution consists in measuring the time of passage between the state, "A" and the state "B", or at least that which appears to be these two states. In effect, this passage time is relatively long. If this time is abnormally short, this signifies that the bread has already been previously toasted. For safety, the supply of electricity is then halted and the bread ejected. A signal or a warning light can then indicate this situation.

According to a variant of construction, the device for control and monitoring by LDR is associated with a "conventional" time control, the control by LDR only assuring one of the roles described previously or operating in parallel in order to guarantee safety, at the same time by an adapted time control, but equally by a control and monitoring by LDR. It is sufficient for this to provide an "or" logic between the stop signal given by the conventional time control and the stop signal given by the LDR control.

Alternatively, the situation can be reversed: the LDR element assures the main function of toasting detection, and the "conventional" time control functioning in parallel to guarantee safety. To each toasting level there thus corresponds a maximum cooking time.

Figure 6:
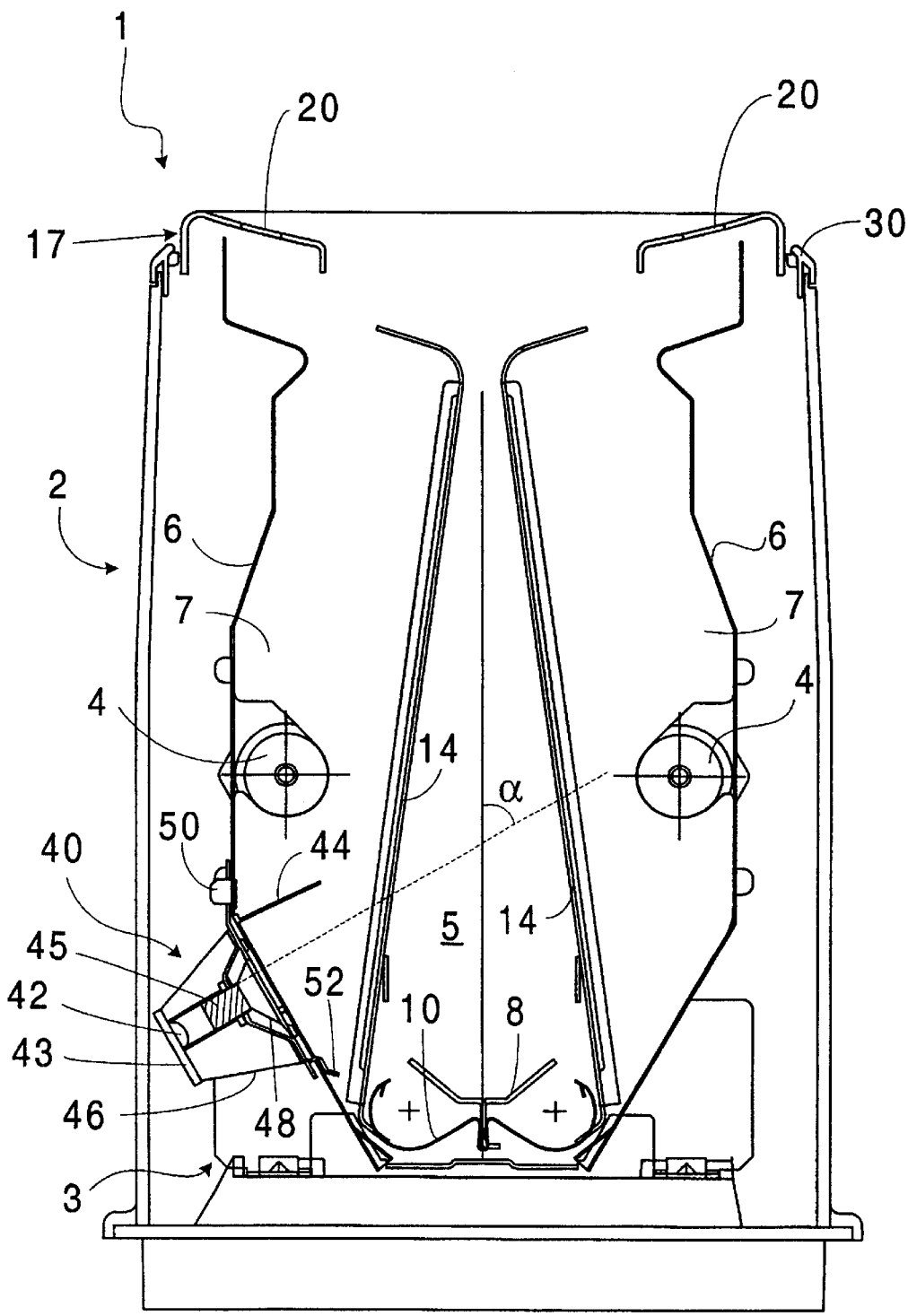
FIG. 6 is a cross-sectional view of a toaster equipped with the present invention.

FIG. 6 presents a possible implantation of a sensor such as previously mentioned in a toaster.

Said toaster 1 has a casing 2, a housing 3, heating elements 4, associated with reflectors 6, lateral walls 7, gripping grids 14 for the bread defining a heating chamber 5, a bread carriage 8 which permits, by spring blades 10, the gripping grids to be pivoted toward the food product introduced into said heating chamber. The toaster, according to the example proposed, equally has a mechanical and/or thermal retaining ring 30, as well as a roof 17 provided with openings 20, permitting the introduction of food products, such as slices of bread along an introductions surface, perpendicular to the cross-sectional plane of the toaster in said figure.

The presentation has intentionally been simplified and does not show notably: the means for retaining the carriage in a lowered position, the means for raising the carriage from the lowered position toward a position for discharging the bread at the end of a cooking cycle, regulation of the desired cooking of the bread, notably.

A device 40 for detecting the coloration of the bread according to the invention is disposed opposite the heating chamber, in an opening arranged in reflector 6 and more particularly in a part of said reflector that permits it to be inclined with respect to the surface of introduction of the bread. According to the proposed example, the angle of inclination is around 60°.

In addition, in the case of use of a light guide, this position avoids creating a sharp bend in the light guide, source of a loss of information by escape of light in this guide.

The device is protected from radiation from the heating elements by a shutter 44, which can be in part cut out of reflector 6.

This device is arranged in this opening with the aid of a holding tab 52 and fixed by any known means 50, such as a rivet.

The internal structure of the device is composed of the LDR sensor 42 itself arranged in a printed circuit board 43, itself disposed on a support 46. A light guide 45 leads the radiation reflected by the bread to the sensor at a spaced location on an electronic card. This prevents the electronic card, or the LDR sensor, from being in immediate proximity with the heating elements of the grilling enclosure. By way of example, this guide can be a glass cylinder, with a diameter of 6 mm. A sheath connects the light guide to the sensor.

Light guide 45 equally assures the thermal protection function. It is coupled to the level of the reflector by a cone.

Figure 7:
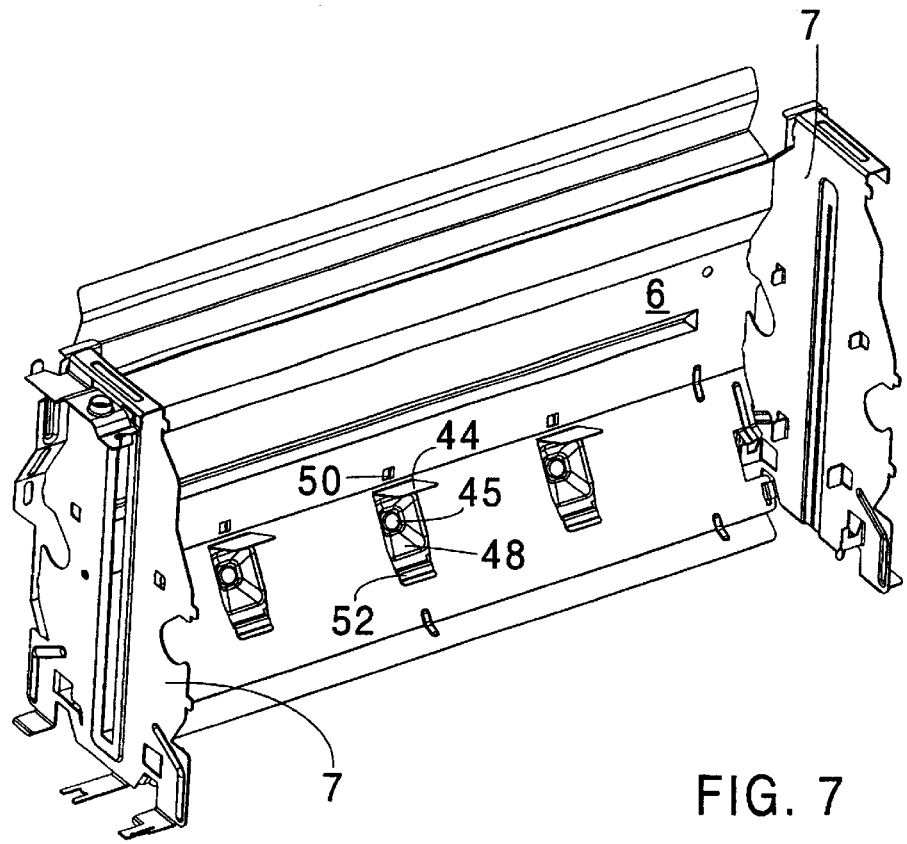
FIG. 7 is a perspective view of the interior of a toaster, only several elements of which are present, in one form of construction of the invention.
Figure 8:
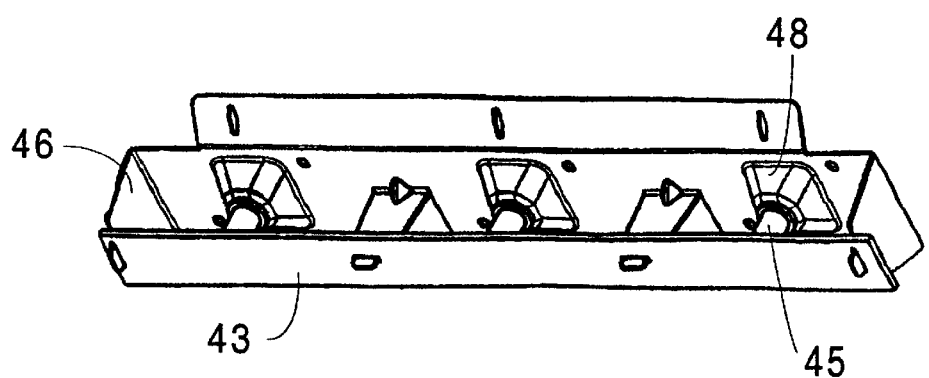
FIG. 8 is a detail rear view of the photo-resistive elements according to the form of construction of FIG. 7.

FIGS. 7 and 8 present a variant of construction where three sensors are used, each sensor being disposed in a similar manner to that which has just been explained, in a cross-sectional view of the toaster as presented in FIG. 6.

According to this specific form of construction, the sensors are distributed along the length of the toaster in such a manner that the field of view of each sensor is provided so that the detection effectively covers ⅓ of the length of the cooking chamber. It is equally possible to adapt the light guide in order to enlarge or reduce the field of view; for example, by acting on the distance separating it from the bread, its inclination, or the form of its extremity which can be rounded for example.

As concerns operation, several solutions can be envisioned when several sensors are utilized. The general principle described previously for a sensor is applicable, each sensor being integrated into a specific mounting such as previously described. Thus, when mounting in a bridge divider is achieved, each sensor presents a connection Mi to microcontroller MC1. During mounting in a R-C circuit, each sensor has two connections Mj, Mk to the microcontroller MC2.

The measurement principle is then to determine the value $R_{LDR}$ for each sensor in order to note, sequentially on each sensor, their time evolution.

However, the decision strategy when information comes from several sensors can be different.

A prudent strategy can be to trigger the turn-off of the heating elements when the evolution of one of the sensors corresponds to the desired grilling state of the bread, such as an "or" function in an electronic system or a "parallel" function for a current flow, for example.

Other strategies for management of a plurality of sensors other than that cited previously can be utilized without departing from the framework of the present invention, for example by averaging the information coming from the different sensors.

Other information can be extracted from the behavior of the different sensors, being able to be exploited by the microcontroller. For example, when certain sensors present a very low resistance value, reflecting an absence of bread, the safety time values can then be lowered in order to take into account that the toaster is going to be heated rapidly because of the small load present.

Other laws of behavior of the different sensors can be defined and exploited by the microcontroller without departing from the framework of the present invention.

The utilization of several sensors can also be envisioned for a relative control of each of the surfaces of the bread. In effect, it can appear desirable to be able to distinguish if the bread does not have two identical surfaces. This can notably be the case when bread of the baguette type is to be toasted. The use then of a sensor oriented toward each of the surfaces permits adjustment of the energy on each of the surfaces of the bread, or to extend the toasting on one of these surfaces, in order that the two surfaces be browned to the same degree.

Advantageously, as shown in FIG. 6, a filter, such as an IR filter, 145 is disposed in front of sensor 42 to contrast the response curve of each LDR sensor and to permit elimination, to a certain extent, of the ambient light coming from the heating elements and the reflectors.

What is claimed is:

1. Method for controlling the grilling, or toasting, of a food product placed in a grilling or toasting appliance for grilling or toasting the food product to a selected one of at least two grilling or toasting states, said appliance comprising heating elements, a heating chamber, a grilling selector for adjusting the level of browning of the food product, means permitting stopping the supply of electricity to the heating elements when the level of grilling or toasting is achieved, said device having a light-receiving system composed of at least one photo-resistive element of the LDR type, the light reflected by the food product being grilled or toasted being brought up to the surface of said element(s), wherein said method comprises measuring the evolution in time of a signal G representative of the light reflectivity of the food product, the signal G having at least two portions that are spaced apart in time and that have respectively different characteristics, and converting each of the respectively different characteristics of that evolution into a respectively different one at least two of the grilling or toasting states of the food product.

2. Method for controlling grilling or toasting according to claim 1, wherein one of the grilling or toasting states is manifested by a slope of the signal G stabilizing at a determined value, or by a zero slope, or by an inversion of the slope, or by a point of inflexion in the slope of the curve, or by a difference in the curve or in the slope of the curve by a certain amount with respect to said value for shorter times.

3. Method for controlling grilling or toasting according to claim 1, wherein said method further comprises determining the ambient temperature within the appliance, and in blocking a new cooking cycle when the value of the ambient temperature exceeds a predetermined value.

4. Method for controlling grilling or toasting according to claim 1, further comprising halting the supply of electricity to the heating elements when, following the start of delivery of electricity to said heating elements, the signal G is below a predetermined value.

5. Method for controlling grilling or toasting according to claim 1, associated with a method for controlling grilling or toasting with a time delay where different grilling or toasting states, determined by the grilling selector, correspond to predetermined cooking times.

6. Method for controlling grilling or toasting according to claim 1, wherein the signal G includes, in time succession, a first portion having a slope in a first direction and stabilizing at a determined value, a second portion having a zero slope, a third portion having a slope in a third direction opposite to the first direction, and a fourth portion having a slope in the second direction, the slope of the fourth portion having a value different from the slope of the third portion, wherein the different portions represent different grilling or toasting states of the food product.

7. Method for controlling the grilling, or toasting, of a food product placed in a grilling appliance, said appliance comprising heating elements, a heating chamber, a grilling selector for adjusting the level of browning of the food product, means permitting stopping the supply of electricity to the heating elements when the level of toasting is achieved, said device having a light-receiving system composed of at least one photo-resistive element of the LDR type, the light reflected by the food product being grilled or toasted being brought up to the surface of said element(s), wherein said method comprises:
measuring the evolution in time of a signal G representative of the light reflectivity of the food product;
converting at least one characteristic of that evolution into at least one of the grilling or toasting states of the food product; and
determining the signal G at two instants close together and following the application of electricity to the heating elements in order to determine, according to the evolution of this signal, the presence or not of a food product in the heating chamber.

8. Device for controlling the grilling or toasting of a food product placed in a grilling or toasting appliance for grilling or toasting the food product to a selected one of at least two grilling or toasting states, said appliance comprising heating elements, a grilling selector permitting adjustment of the level of browning of the food product, means permitting stopping the supply of electricity to the heating elements when the grilling level is attained, a microcontroller (MC1, MC2), said device having a light receiving system composed of at least one photo-resistive element of LDR type, the light reflected by the food product being grilled being brought up to the surface of said element(s), the reflected light being converted to a voltage signal in an electronic circuit, wherein this voltage is transformed into a signal G which can be the value of the resistance of the photo-resistive element or of one of the photo-resistive elements, or a magnitude proportional to said resistance, said signal being stored at successive instants in the microcontroller, in order to determine the evolution of said signal and to stop the heating elements according to at least one predetermined evolution criterion, the signal G having at least two portions that are spaced apart in time and that have respectively different characteristics, and wherein said means permitting stopping the supply of electricity to the heating elements are operative to convert each of the respectively different characteristics of that evolution into at a respective one of least two of the grilling or toasting states of the food product.

9. Device for controlling grilling or toasting according to claim 8, wherein the at least one predetermined evolution criterion comprises at least two evolution criteria representing different grilling states of the food product.

10. Device for controlling grilling or toasting according to claim 8, wherein the signal G is constituted by the value of the resistance $R_{LDR}$ of the photo-resistive element or of one of the photo-resistive elements, obtained by measuring the voltage at the terminals of this element in a dividing bridge arrangement, said voltage being sent to an analog input-output port of the microcontroller MC1.

11. Device for controlling grilling or toasting according to claim 8, further comprising an ambient temperature sensor of the NTC or PTC type.

12. Device for controlling grilling or toasting according to claim 8, further comprising an ambient temperature sensor based on the frequency variation of an oscillating system of the R-C type.

13. Device for controlling grilling or toasting according to claim 8, further comprising a light guide that connects the heating chamber of the appliance to each photo-resistive sensor situated on an electronic card spaced from the heating chamber.

14. Device for controlling grilling or toasting according to claim 8, further comprising a filter, such as an IR filter, disposed in front of each photo-resistive element in order to contrast the response curve of each LDR sensor.

15. Device for controlling grilling or toasting of a food product placed in a grilling or toasting appliance, said appliance comprising heating elements, a grilling selector permitting adjustment of the level of browning of the food product, means permitting stopping the supply of electricity to the heating elements when the grilling level is attained, a microcontroller (MC1, MC2), said device having a light receiving system composed of at least one photo-resistive element of LDR type, the light reflected by the food product being grilled being brought up to the surface of said element(s), the reflected light being converted to a voltage signal in an electronic circuit permitting measurement of a voltage, wherein this voltage is transformed into a signal G which can be the value of the resistance of the photo-resistive element or of one of the photo-resistive elements, or a magnitude proportional to said resistance, said signal being stored at successive instants in the microcontroller, in order to determine the evolution of said signal and to stop the heating elements according to at least one predetermined evolution criterion, wherein the signal G is constituted by the time $\tau$ for charging a capacitor C through the resistance $R_{LDR}$ presented by the photo-resistive element or one of the photo-resistive elements, each element being associated with a capacitor and connected to numeric inlet-outlet ports of the microcontroller MC2.

16. Device for controlling grilling or toasting of a food product placed in a grilling or toasting appliance, said appliance comprising heating elements, a grilling selector permitting adjustment of the level of browning of the food product, means permitting stopping the supply of electricity to the heating elements when the grilling level is attained, a microcontroller (MC1, MC2), said device having a light receiving system composed of at least one photo-resistive element of LDR type, the light reflected by the food product being grilled being brought up to the surface of said element(s), the reflected light being converted to a voltage signal in an electronic circuit permitting measurement of a voltage, wherein this voltage is transformed into a signal G which can be the value of the resistance of the photo-resistive element or of one of the photo-resistive elements, or a magnitude proportional to said resistance, said signal being stored at successive instants in the microcontroller, in order to determine the evolution of said signal and to stop the heating elements according to at least one predetermined evolution criterion, said device further comprising at least two photo-resistive elements, and wherein the signal G is successively and cyclically determined for each photo-resistive element.

17. Device for controlling grilling or toasting according to claim 16, wherein stopping of the heating elements is triggered as soon as the evolution of the signal G of one of the photo-resistive elements attains the at least one predetermined evolution criterion.

18. Device for controlling grilling or toasting according to claim 16, wherein the evolutions of the signal G of the different photo-resistive elements are linked in order to determine the operating state of the appliance.

19. Device for controlling the grilling or toasting of a food product placed in a grilling or toasting appliance, said appliance comprising heating elements, a heating chamber comprising a surface for introduction of the food product, a grilling selector permitting adjustment of the level of browning of the food product, means permitting stopping of the electric supply to the heating elements when the browning level is attained, said device having a light receiving system for measuring the evolution in time of a signal G representative of the light reflectivity of the food product, said system being composed of at least two photo-resistive sensors of the LDR type, wherein the sensors are arranged on a line parallel to the surface of introduction of the food product, facing said food product.

20. Device for controlling grilling or toasting according to claim 19, further comprising three sensors equidistant from one another, the central sensor being substantially disposed facing the heating chamber, in its central plane.

21. Device for controlling grilling or toasting of a food product placed in a grilling or toasting appliance, said appliance comprising heating elements, a heating chamber comprising a surface for introduction of the food product, a grilling selector permitting adjustment of the level of browning of the food product, means permitting stopping of the electric supply to the heating elements when the browning level is attained, said device having a light receiving system composed of at least two photo-resistive sensors of the LDR type, wherein the sensors are arranged on a line parallel to the surface of introduction of the food product, facing said food product; wherein the sensors are inclined with respect to the plane of introduction of the food product by an angle between 30 and 90.

22. Cooking appliance constituting a toaster or oven for toasting or cooking a food product to a selected one of at least two toasting or cooking states, said appliance comprising means for measuring the evolution in time of a signal G representative of the light reflectivity of the food product, the signal G having at least two portions that are spaced apart in time and that have respectively different characteristics, and for converting each of the respectively different characteristics of that evolution into at least two of the toasting or cooking states of the food product.

23. Cooking appliance constituting a toaster or oven, said appliance comprising a device for controlling grilling or toasting of food products according to claim 8.

* * * * *